United States Patent [19]

Nixon

[11] Patent Number: 4,511,396
[45] Date of Patent: Apr. 16, 1985

[54] REFINING OF METALS

[76] Inventor: Ivor G. Nixon, ler Stock Ost "Matterhorngruss", Steinmattstrasse, Valais, 3920 Zermatt, Switzerland

[21] Appl. No.: 525,965

[22] Filed: Aug. 24, 1983

[30] Foreign Application Priority Data

Sep. 1, 1983 [GB] United Kingdom ............. 8224950

[51] Int. Cl.$^3$ ........................... C21C 7/00; C22B 9/10
[52] U.S. Cl. ...................................... 75/51.1; 75/257;
75/51.7; 75/51.4; 75/51.6
[58] Field of Search ................. 75/52, 257, 51, 53

[56] References Cited

U.S. PATENT DOCUMENTS

| | | | |
|---|---|---|---|
| 3,507,642 | 4/1970 | Shaw | 75/52 |
| 3,771,998 | 11/1973 | Knuppel | 75/52 |
| 3,811,870 | 5/1974 | Bieler | 75/52 |
| 3,884,678 | 5/1975 | Iyengar | 75/52 |
| 4,105,439 | 8/1978 | Barnes | 75/51 |
| 4,295,882 | 10/1981 | Arima | 75/52 |

FOREIGN PATENT DOCUMENTS 1321292  6/1973  United Kingdom ............. 75/52

Primary Examiner—Peter D. Rosenberg
Attorney, Agent, or Firm—McAulay, Fields, Fisher, Goldstein & Nissen

[57] ABSTRACT

This invention uses a dual basicity (DB) flux during the refining of steel which comprises the use of one or more flux components with high basicity/activity, for example sodium carbonate and/or barium oxide, with one or more normal fluxes having a lower basicity/activity such as calcium or magnesium oxides or dolomite. It has been found that it is only necessary to use a small percentage of the said high basicity fluxes in the total flux, for example 10%. The use of the said DB type of flux is particularly apt when the total amount of flux used is reduced to give a slag with a low Vee Ratio (CaO:-SiO$_2$), of the order of 1.0 to 2.0, and when magnesia is present in the slag formed preferably derived from an added lower basicity (MgO) flux component or partly from the furnace refractory lining.

12 Claims, 1 Drawing Figure

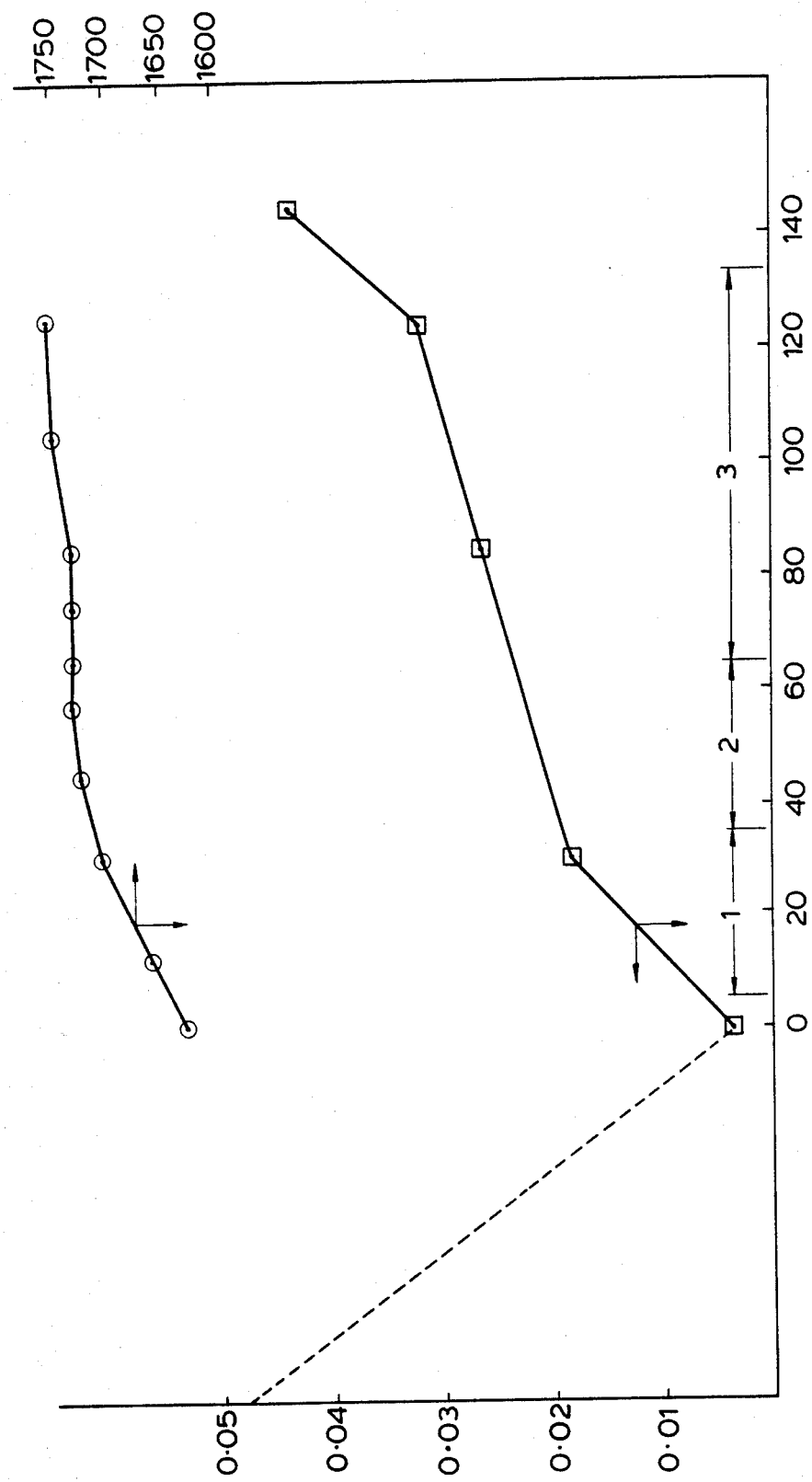

REFINING OF METALS

This invention relates to the refining of metals, and more particularly to the use of fluxes for the refining of steel melts in the manufacture of steels, alloy steels and ferrous alloys.

In the manufacture of steel melts the impurities in the molten metal are refined out by blowing the melt with an oxidising gas. Elemental oxygen, for example, is used for this purpose in the conventional Basic Oxygen Steel ('BOS') process, or as described in my British patent specification No. 1,508,591 by using a blowgas containing carbon dioxide or water vapour as oxidants. Alternatively, in my British patent specification No. 1,508,592 the impurities can be oxidised by using a metallic oxide such as wustite alone or in combination with one or more other metallic oxides together with a blowgas. The said blowgas can be of the compositions used in my British patent specification No. 1,508,591, or an 'inert' gas such as nitrogen, argon, or carbon monoxide. The said inert gases can also comprise mixtures of two or more of these inert gases, and can also include hydrogen which is 'inert' as far as the oxidation of impurities in the melt is concerned. The said inert gases serve to strip out and purge from the melt any gaseous oxidation products formed by oxidation of impurities in the melt, such as carbon monoxide from carbon, and sulphur dioxide (at high oxygen potential in the melt) from sulphur, which are thus partly or wholly removed from the melt system in the off-gases.

In addition to gaseous oxidation products, non-volatile acidic oxides are formed, for example, silicon dioxide from silicon and phosphorus oxides from phosphorus. It is customary to add so-called fluxes to the melt, which are usually basic oxides (or carbonates) of the alkaline earth metals, such as calcium oxide (lime), whose function is to neutralise the said non-volatile acidic oxides, formed in the refining process, producing for example silicates which constitute the major proportion of the slag components, together with other compounds such as calcium phosphate formed by reaction between the base and the acidic impurity. These reactions 'fix' the impurities in the slag formed as the said silicates and other salts, and these are removed in the slag by tapping it off from the melt vessel, thus reducing the content of the impurities left in the molten metal. Silicates are the main constituent of normal slags, their concentrations in the refining slag formed depending on the amounts of the flux components employed and the basicity of the slag, normally measured by the Vee ratio ($CaO:SiO_2$). Di-Base slags are formed in slags with high Vee ratios. Some typical silicates are given in Table I:

TABLE I

Typical Silicates in Normal Slags

| Type of Silicate | Formula | Melting Point °C. |
|---|---|---|
| Calcium Silicate (Wollastonite) | $CaSiO_3$ | 1544° |
| Magnesium Silicate | $MgSiO_3$ | 1525° |
| Ca/Mg Silicate (Diopside) | $CaMg(SiO_3)_2$ | 1391.5° |
| Di-calcium Silicate | $Ca_2SiO_4$ | 2130° |
| Di-magnesium Silicate (Fosterite) | $Mg_2SiO_4$ | 1890° |

Minor quantities of other fluxes can be added to the main flux used (which is usually lime) for special purposes, for example, calcium fluoride (Fluorspar—$CaF_2$) or Bauxite ($Al_2O_3$), to form a fluid slag, or calcium carbide or lime plus carbon to form a reducing slag.

The use is also known of oxides or carbonates of other alkaline earth metal such as barium oxide, or of the alkali metals, for example sodium carbonate, instead of lime. These fluxes, which have a higher basicity than lime and are therefore more effective in removing acidic impurities such as phosphorus oxide into the slag, are not however generally used in the art because such fluxes are more expensive than lime and/or, particularly in the case of those derived from the alkali group of metals, cause heavy attack of the refractory lining, making their use inadvisable.

I now find that the use of two neutralising fluxes having substantially different basicities can be applied, with advantage, in the refining of steel melts.

Accordingly, the present invention provides a method for the refining of a steel melt with a blowgas in the presence of a flux, wherein the flux is a dual basicity (DB) flux in which a major proportion of the flux comprises one or more primary flux components having a normal, lower basicity/activity (e.g. calcium and/or magnesium oxide) and a minor proportion of the flux comprises one or more secondary flux components having a higher basicity/activity (e.g. barium oxide and/or sodium carbonate).

According to this novel concept, a combination of two or more basic fluxes are used of which the major proportion of the flux used is a normal basic flux having a moderate basicity, such as lime/magnesia, and a minor proportion of the total flux used comprises one or more other fluxes having a substantially higher basicity than the major proportion. The said higher basicity fluxes can comprise, for example, one or more of the oxides, hydroxides or carbonates of the alkali metals or one or more of the oxides, hydroxides or carbonates of the alkaline earth metals which have higher basicity/activity. The oxides (or carbonates) of the alkali metals are preferably those of lithium, sodium or potassium. Barium oxide and/or sodium carbonate are most preferred as the higher basicity flux. For convenience, the said normal "moderate basicity" fluxes are herein referred to as a primary flux, the said "higher basicity" flux is referred to as a secondary flux, and the novel method of using the two types of fluxes in combination for the refining of a steel melt as the 'DB' (Dual Basicity) method of refining.

The secondary flux will normally be used in an amount of 50 to 0.2%wt. of the total flux used and more preferably in an amount of 25 to 2%wt.

Any known blow gas can be used for refining the molten metal. Thus an oxidising gas or mixture of gases such as oxygen, air, carbon dioxide or water vapour can be used which is top blown, side blown or bottom blown into or onto the melt and in which the DB flux is added either in the initial charge, or during the blowing operation in order to fix the impurities oxidised by the blow gas as a slag. Alternatively partly reduced sponge iron or another metallic oxide can be used as oxidant for refining the melt (as described in my British Pat. Nos. 1508592 and 1508591), in which case the blow gas is an inert gas such as nitrogen, argon or hydrogen, or an oxidising gas as described above or a mixture thereof. Refining of the steel melt may be carried out in any known type of steel converter, electric furnace or other equipment used for refining steel melts or in a combination of these.

Using the said combination of primary and secondary fluxes, the primary flux normally serves substantially to neutralise the silica which forms the bulk of the acidic components formed by oxidation of the melt and present in the slag, while the secondary flux, for example barium oxide, remains available substantially to 'fix' the acidic components with a high acidity which are present in the slag, such as for example, phosphorus pentoxide. Of course, when a flux includes a 'distribution spectrum' of both acidic and basic components ranging from low to high, the tendency will be for the high acidity components to combine mainly with the high basicity components, but not entirely so, part of the high basicity components (secondary fluxes) reacting with the lesser acidic components, spread over their 'spectrum' of presence in the melt slag. The extent to which this happens depends on the concentrations, acitivities and types of components making up the total melt slag. Fortunately, the proportion of most of the acidic impurities, such as phosphorus pentoxide, present in the total slag is relatively very low so that only a small proportion of a high basicity secondary flux is needed to neutralise it. The situation is particularly favourable in the case of phosphorus pentoxide which has a relatively high acidity, favouring its reaction with the said secondary flux. Similarly, sulphur compounds, for example barium sulphide and sulphate can be formed, respectively when the melt has a low oxygen potential (reducing slag) with hydrogen sulphide acting as a weak acid, and a high oxygen potential. For other secondary fluxes, such as bases of the alkali metals, for example sodium carbonate, the corresponding salts will be formed, namely sodium phosphate, sulphide and sulphate.

The proportion of secondary flux used will depend upon the melt composition, operating conditions and steel specification required, and will need to be adjusted to suit these conditions. For example, the said proportion will need to be higher when the sulphur and phosphorus contents of the melt are high, and when a lower content of these impurities is called for in the final steel specification, and vice versa. In normal cases, the amount of these, and other impurities, present in the slag formed are so low compared with that of silica that the ratio of secondary flux to primary flux used can be very low, say, of the order of 10% by weight or less (ratio 1:9). This factor makes the use of the said DB method feasible, in spite of higher cost and/or higher corrosivity (vessel lining) of the secondary flux.

The said DB method of refining can be used advantageously for refining any melt: carbon steels, alloy steels, ferrous alloys or scrap melts, working generally in accordance with the practice of the art for refining such melts, except for the novel feature of using the said DB method and primary and secondary fluxes in the manner described. For example, the customary practice of using a 'two slag' treatment of the metal bath can be employed (my British Pat. No. 1369595 and British Patent Application Publication No. 2076858A), withdrawing a 'flush' slag in the early part of the melt cycle (containing the bulk of the impurity, say, phosphorus) and following this by a further amount of flux as a second addition to obtain a billet with a very low impurity content (P%), or by alternatively using continuous flux addition and slag withdrawal as described and claimed in my British Patent Application Publication No. 2076858A. When following the DB method either or both, but particularly the second flux addition, can be advantageously the said DB flux mixture of primary and secondary fluxes. Also, the DB flux mixture can be blown into the melt as a suspension in the blow gas, in order to obtain intimate contact and improved reaction with the melt, in accordance with known practice in the art. The said blowgas can be any known blowgas, used for refining and oxidising the impurities from the melt, for example: oxygen, air and their mixtures with water vapour, carbon dioxide and/or an inert gas such as argon or nitrogen. Also, the said DB method is particularly advantageous when used in conjunction with blowgas mixtures containing carbon dioxide, water vapour and their mixtures as the oxidants (the 'SS method') as described in my British patent application GB No. 2 076 858 A, and British patent specifications Nos. 1,508,591 and 1,508,592 and my earlier patents referred to therein.

The use of the said SS methods for blowing a melt which is being refined using the said DB method is particularly apt as, when using the SS methods, advantage can be taken of the degree of control and flexibility inherent in them. For instance, the said SS blowgas composition can be adjusted at will to give a blowgas which will result in oxygen potential conditions in the melt (conveniently followed by the H ratio of the off-gases from the melt —$H_2O:H_2$) which can be either oxidising or reducing, so that the slag can be formed so as to be either 'oxidising' or 'reducing'. This makes it possible, for example in a 'two slag' operation, to set the oxygen potential conditions so that a flush slag with most of the phosphorus content of the melt present in it is removed and 'tapped-off' leaving a melt with a very low phosphorus content. The said flush slag initially formed can have a high content of ferrous and manganese oxides, particularly if the initial charge contains partly reduced sponge iron the said oxides being derived from the wustite present in it. When the oxygen potential of the melt is lowered this oxide content will fall again. When using the said DB method of operation, for example using barium oxide as the secondary flux in combination with lime in the ratio of 1:9, the melt phosphorus can be reduced to 0.004% and the slag removed. The SS blowgas can then have its composition adjusted so that a reducing slag is formed, when using a second flux addition in accordance with the said DB method, using for example a minor proportion of, say, sodium carbonate as the secondary flux and lime as the primary flux. The said reducing slag, and oxygen potential of the melt, then constitute ideal conditions for reducing the sulphur content of the melt to a low figure.

Because the secondary fluxes are used in very low concentrations, the refractory attack is negligable or limited whatever steel process is used for generating the melt being refined, when using the said DB method of refining. However, the use of the SS method for preparing the steel melt is particularly advantageous because of the low degree of refractory attack which has been demonstrated by experimental melts The low degree of refractory attack in SS steel melts is primarily due to the control of the oxygen potential of the blowgas, so that it operates under 'reversible reaction' conditions, using carbon dioxide, water vapour and ferrous oxide (FeO) etc as the oxidants instead of elemental oxygen which gives an explosive reaction. As a result, the melt impurities are refined out preferentially without gross formation of iron oxides being possible, the slag being finished with a low FeO content normally well below 5%. The SS methods incorporate other additional features which reduce refractory attack:

(1) Because the ferric oxide content of the slag is low, refractory attack is suppressed because high contents of iron oxides, and those from other metals, are avoided which flux the refractory lining of the vessel (for example magnesia) as a low melting point slag in combination with silica, which dissolves in the slag generated in the refining process, (2) A low Vee ratio ($CaO:SiO_2$) slag is preferably used for SS operation, say, in the range 0.5 to 2.0, preferably 1.0 to 1.5. This slag is fluid and reactive, and gives low phosphorus and sulphur content steels (see, for example my British Patent Specification Nos. 1,508,591 and 1,508,592, and British Patent Application GB No. 2,076,858 A). This resulting low slag yield, coupled with a low ferric oxide content (see 1) above) gives also a low slag yield, and therefore a diminished rate of attack compared with normal slags.

(3) The use of MgO in combination with lime as a slag is recommended so that the slag generated in the melt is substantially saturated with magnesia, thus suppressing its solution from the refractory lining, (see my cited Patent specifications).

(4) The low Vee ratio slag comprises mainly the monosilicate wollastonite ($CaO.SiO_2$), substantially saturated with amphibole ($MgO.SiO_2$), this combination—Diopside M.P. 1392° C. (with low percentages of impurities oxidised out of the melt) having as is normal a depressed melting point compared with that of its two main components wollastonite and amphibole. In the 'massive' presence of excess MgO in the refractory lining, the fluid $CaO.SiO_2$ component (M.P. 1544° C.) in the slag presumably (approachingl) saturation with MgO) tends to react with the MgO lining to form Forsterite ($2MgO.SiO_2$—M.P. 1890° C.), which forms a protective layer over the inner refractory lining, which is at an appreciably lower temperature than that of the melt bath, provided that the slag has a sufficiently low FeO content which otherwise would cause the protective layer to be fluxed away.

These factors all tend to explain the almost incredibly low crucible wall attack found for experimental SS melts made under correct conditions. Consequently, the very low concentrations of the secondary fluxes, which are highly basic, can be tolerated in the slag formed by using the said DB method of operation without encountering excessive attack and slagging of the refractory lining of the steel vessel.

A further advantageous use of the said DB method of refining steel melts is to use it for the purpose of finishing a steel melt with a low phosphorus content while at the same time reducing the hydrogen and carbon contents of the melt and its oxygen potential in the following manner. A small amount of partly reduced iron sponge is added to the melt, after removing the main refining slag (first slag-off) in a quantity calculated to the sufficient to remove the hydrogen and oxygen in solution in the melt. The melt is then blown for a short period as described in my British patent application GB No. 2 076 858 A with carbon monoxide, to stir it and strip out hydrogen, water vapour and carbon dioxide from it (approximately in the proportions called for by the Shift Reaction equilibrium), having previously added a small amount of flux according to the DB method containing a small proportion of a suitable secondary flux such as barium oxide to further lower the phosphorus content of the melt. Finally, a short blow with an inert gas, such as argon, can be used to finish the melt, the argon being substituted for two carbon monoxide as soon as the hydrogen removal is substantially completed. In this manner the oxygen content and hydrogen content of the melt can be lowered, while at the same time the phosphorus content is further reduced.

The invention is illustrated by the following examples and the accompanying drawing. In the examples experimental melts were carried out in a laboratory converter, as described in my cited patents, simulating full-scale melt conditions. The accompanying drawing is a graph illustrating temperature and % by weight phosphorus in the process of example 1. The examples illustrate the application of this invention to the refining of steel melts. Other alternative permutations or combinations of the composition of the 'DB' flux can be used as will be clear to one skilled in the art.

EXAMPLE 1

A 700 gram melt of an alloy steel, with a 17.8% chromium content and a carbon content of 0.43%, the charge including 5% wt. of partly reduced sponge iron (61% reduced), was refined by blowing with a superheated gas stream containing 24% mol. of carbon dioxide/water vapour as oxidant, in accordance with the method described in my British Pat. No. 1,518,592, using 1% wt. of 'DB' flux on the charge, containing 90% wt. of lime and 10% wt. of barium oxide, as primary and secondary flux components respectively. The initial phosphorus content of the melt was 0.047% and the refined sample at full melt (1632° C.) was reduced to 0.004% wt., showing a 91.5% removal of phosphorus, to a very low percentage, by the use of the said DB method of refining. The melt was finished with an A/B blow according to the method described in my British patent application publication No. 2 076 858A, giving a final billet (at 1725° C.) with a carbon content of 0.00% and a phosphorus content of 0.043% wt. This result showed the typical phosphorus reversion resulting from the low oxygen potential caused by a partial hydrogen blow (see the accompanying drawing), and demonstrates the need for a flush slag removal in a two slag-off type of operation, to obtain a low phosphorus content steel, as specified in my cited patents. The total slag make was 4.7% wt. and its calculated Vee ratio was 1.26. The melt crucible was in good condition, showing slight penetration of greenish flush slag in the crucible wall, but no appreciable attack.

In the accompanying drawing the top curve represents % by weight phosphorus (scale on left hand axis) and the bottom curve represents temperature of the melt in °C. (scale on right hand axis). The bottom axis represents time in minutes. The time up to zero is the melting period and the time following zero represents time from a clear melt. The three sections marked (1), (2) and (3) represent three blows in accordance with the following blow schedule:
(1) 24% oxidant
(2) 12% oxidant
(3) A/B blow: hydrogen/12% oxidant, 7 and 3 minutes alternating.

EXAMPLE 2

This melt was carried out under similar conditions to those described for Example 1, except that 1% wt. of lime was used as flux instead of 1% wt. of DB flux and the amount of partly reduced iron sponge in the total charge was increased to 8.6% wt. (62% reduced), no secondary type flux being used. The melt charge had a chromium content of 18% and a carbon content of 0.43% wt. and an initial phosphorus content of 0.046% wt. The sample after full melt (1573° C.) had a phosphorus content of 0.011% wt., showing a phosphorus removal of only 76%. The total slag make was 6.6% wt, and its calculated Vee ratio was 1.17. The melt crucible was in good condition showing somewhat more penetration of black coloured flush slag into the crucible wall (1 mm.), but no appreciable attack. Compared with Example 1 the resulting dephosphorization was inferior, in spite of the more favourable operating conditions: i.e. lower melt temperature and appreciably higher melt oxygen potential arising from the higher percentage of partly reduced sponge iron charged, both factors favouring phosphorus removal. This demonstrates the beneficial effect of the use of the dual basicity ('DB') flux operation with only 10% of barium oxide as the secondary flux component in the total flux.

I claim:

1. A method for the refining of a steel melt with a blow gas in the presence of a flux in which said flux is a dual basicity (DB) flux, a major proportion of which comprises one or more primary flux components having a basicity/activity which is equal to or lower then that of lime and a minor proportion of which comprises one or more secondary flux components having a basicity/activity higher than that of lime.

2. A method as claimed in claim 1, in which the content of said secondary flux components lies in the range of 50 to 0.2% wt. of total flux used.

3. A method as claimed in claim 1, in which the content of said secondary flux components lies in the range of 25 to 2% wt, of total flux used.

4. A method as claimed in claim 1, in which said secondary flux components are selected from the group consisting of oxides, hydroxides and carbonates of the alkali metals, oxides, hydroxides or carbonates of the alkaline earth metals which have the higher basicity/activity, and mixtures thereof.

5. A method as claimed in claim 4, in which said secondary flux components are selected from the group consisting of oxides, hydroxides and carbonates of lithium, sodium and potassium, and mixtures thereof.

6. A method as claimed in claim 4, in which said secondary flux component is selected from the group consisting of barium oxide and sodium carbonate.

7. A method as claimed in claim 1, in which said steel melt is refined by blowing with an oxidising gas or mixture of gases which is top blown, side blown or bottom blown into or into the melt, and in which said DB flux is added either in the initial charge, or during the blowing operation, in order to fix the impurities oxidised by the blow gas as a slag.

8. A method as claimed in claim 1, in which partly reduced sponge iron or another metallic oxide is used as oxidant for refining said melt, and said blowgas is an inert gas, an oxidising gas or a mixture thereof.

9. A method as claimed in claim 6 or claim 7, in which said oxidising gas or mixture of gases is selected from the group consisting of oxygen, air, carbon dioxide and water vapour.

10. A method as claimed in claim 8, in which said inert gas is selected from the group consisting of nitrogen, argon and hydrogen.

11. A method as claimed in claim 1, carried out in a steel converter, electric furnace or other equipment for refining steel melts.

12. A method as claimed in claim 1, in which the amount and composition of said flux used is adjusted so that it yields a slag with a Vee ratio from 0.5 to 2.0, and in which sufficient magnesia is incorporated in said slag so that there is a tendency for high melting point silicates to form a protective coating on the refractory lining of the vessel, which is at a lower temperature than that of said melt itself due to cooling.

* * * * *